March 1, 1960 R. H. VACCA 2,927,217
MEASURING
Filed April 8, 1955
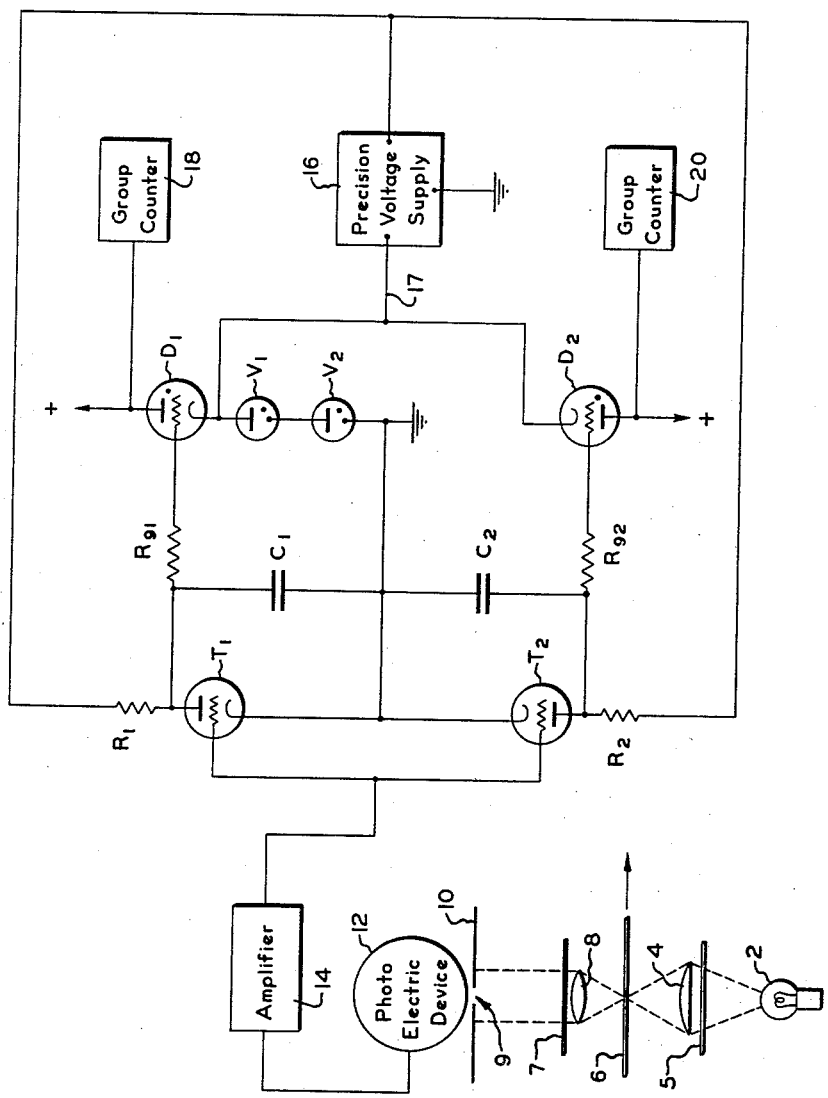
INVENTOR.
Ralph H. Vacca
BY
Oliver W. Hayes
ATTORNEY United States Patent Office 2,927,217
Patented Mar. 1, 1960

2,927,217

MEASURING

Ralph H. Vacca, Waltham, Mass., assignor to National Research Corporation, Cambridge, Mass., a corporation of Massachusetts Application April 8, 1955, Serial No. 500,094

5 Claims. (Cl. 250—219)

This invention relates to measuring and more particularly to improvements in measuring the duration of electrical pulses.

A principal object of this invention is to provide an improved electrical means for measuring the size distribution of a group of objects.

Another object of the invention is to provide a stabilized measuring circuit whose accuracy will remain constant over a wide range of fluctuations of voltage supply.

Still another object of the invention is to provide a measuring system of the above type which is particularly applicable to the measurement of textile fiber diameters and the size distribution of a group of textile fibers.

Still another object of the invention is to provide a measuring system of the above type which has excellent reproducibility over a wide range of operating conditions.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing, which is a diagrammatic illustration of one preferred embodiment of the present invention.

In many applications of measuring techniques, a series of electrical pulses is created, each pulse having a length which bears a definite relationship to the size of an object to be measured. When a plurality of such objects are to be measured and their size distribution is to be determined, some means must be provided for accurately measuring electrical pulse length and for discriminating between electrical pulses of different lengths so as to energize suitable counting circuits. One apparatus requiring such discriminating circuits is a fiber fineness meter of the type described in the copending application of Roehrig, Serial No. 452,015, filed August 25, 1954, now U. S. Patent No. 2,824,487. The invention described in the above mentioned Roehrig application is particularly directed to the measurement of the size distribution of textile fibers (such as wool fibers), and the present invention will be described primarily in connection with its application to a measuring system of the type illustrated in the above Roehrig application.

When employed for measuring the particle size of wool fibers, for example, the apparatus comprises means for optically scanning a plurality of wool fibers arranged in a parallel manner so as to provide a plurality of electrical pulses whose duration bears direct relationships to the diameters of the individual wool fibers. These electrical pulses are amplified and fed to a plurality of capacitors arranged to be charged by the pulses at appropriately chosen relatively steady rates. There are also provided a plurality of discriminator tubes whose operation is controlled by the value of voltage to which the capacitor has been charged. Each discriminator tube is normally non-conductive and is arranged to conduct when the voltage on its associated capacitor reaches a predetermined amount.

In a preferred embodiment of the invention, there is one discriminator tube controlled by each capacitor, the relationship between the various tubes and the various capacitors being such that pulses of different lengths will fire different discriminator tubes. The measuring system also includes a regulated power supply for charging each capacitor and a voltage regulator tube for controlling both the bias of the discriminator tubes and the output of the regulated power supply so that a variation in the output of the voltage regulator tube will produce counterbalancing changes in both the bias of the discriminator tube and the amplitude of the capacitor charging current. As a result of this arangement, each tube will be fired at a set predetermined time after the start of the charging of its associated capacitor. If the voltage regulator tube voltage should drop, it will lower the bias of the discriminator tube. However, it will also lower the charging current so that the time necessary for producing a firing charge on the capacitor will not be changed. The measuring system also includes counting means controlled by each discriminator tube so that the firing of each tube will be suitably recorded.

Referring now to the drawing, there is shown one preferred embodiment of the invention. A suitable source of light 2 is provided for the optical scanning system. The light from this source is preferably polarized by means of a linear polarizing filter 5 and then concentrated into a beam by means of lens 4 which is of the converging or condensing type. The polarized light then falls upon the transparent support 6 which is held in the focal plane of the optical system and upon which is positioned a number of fibers aligned in a substantially parallel relationship. The fibers are aligned at an appreciable angle (preferably 45°) with respect to the plane of polarization of linear polarizing filter 5. The polarized light passing from the polarizing filter 5 passes through the transparent support 6 holding the aligned fibers thereon. Each optically anisotropic fiber on transparent support 6 elliptically modifies the plane polarized light. The relationship between this elliptical modification of the polarized light and the linear polarizing filter 7 is preferably such that only the light which has passed through the optically anisotropic fiber is transmitted through the linear polarizing filter 7. The light from each such fiber passes through lens 8 and linear polarizing filter 7 and is then directed through the small slot or slit 9 in the shield 10 which limits the quantity of light admitted to the photoelectric device 12. The width of the slit 9 in the shield 10 is preferably considerably less than the projected diameter of the smallest fiber to be measured, since the accuracy of the measurements depends, to a large exent, upon the width of slit 9. Thus, the smaller the slit 9, the more accurate the measurements will be. Slit 9 is also preferably shorter than the fibers and preferably narrower than one-tenth of the smallest projected fiber diameter so as to provide accurate diameter measurements.

At 12 there is indicated a photoelectric device. This may be any one of the well-known photoelectric cells whose electrical properties are changed when the illumination thereof is varied. Thus, when there is a change in the quantity of light passing through the slit 9 and striking the photoelectric device 12, there is produced an electrical signal. In the present case, the variation of illumination on the photoelectrical device 12 is produced by moving the transparent support 6 with the parallel aligned fibers thereon at a constant rate in a direction which is preferably normal to the fiber length. When the transparent support is thus moved at a constant rate by a means such as a synchronous motor, each fiber image passes successively by the slit 9. Since the image of the fiber length is arranged substantially parallel to the length of slit 9 and since the fibers are aligned in a substantially parallel relationship, the variation of the illumination caused by the passage of a fiber image on the photoelectric device 12 produces a sharp electrical signal with the passage of the image of a fiber edge. The length of the electrical signal so formed is thus directly proportional to the diameter of the scanned fiber image.

The pulse-length-modulated electrical signals are then preferably amplified by means of a suitable amplifier 14 and fed to switching tubes $T_1$ and $T_2$. These switching tubes are normally conductive so that their associated capacitors $C_1$ and $C_2$ are ordinarily maintained at a relatively low voltage. When the length-modulated pulse reaches $T_1$, for example, its grid is held negative so that $T_1$ no longer conducts. Capacitor $C_1$ then commences to charge through resistor $R_1$, the charging rate being controlled by a precision voltage supply 16 and the time constant $R_1C_1$. When the capacitor $C_1$ is sufficiently charged to overcome the bias of the discriminator tube $D_1$, tube $D_1$ will draw current through its grid-isolating resistor $Rg_1$ and will commence to conduct plate current, feeding a count signal into group counter circuit 18. The bias of discriminator tube $D_1$ is controlled by a pair of voltage regulator tubes $V_1$ and $V_2$. As illustrated, a second switching tube $T_2$ controls the charging of capacitor $C_2$ through resistor $R_2$ in a similar fashion so as to control the firing of the second discriminator tube $D_2$. As can be seen, the bias of discriminator tube $D_2$ is also controlled by voltage regulator tubes $V_1$ and $V_2$. The reference voltage point of the precision voltage supply 16 is also connected by lead 17 to the common voltage regulator tubes $V_1$ and $V_2$ so that the output voltage of the precision voltage supply is a function of the operation of the voltage regulator tubes $V_1$ and $V_2$.

In order to understand the operation of the circuit, assume that group counter 18 and its associated discriminator tube $D_1$ are arranged to count all fibers whose diameter exceeds a preset small value, while group counter 20 and its associated discriminator tube $D_2$ are arranged to count all fibers whose diameter exceeds a preset larger value. Suppose that a relatively small fiber is scanned by the optical system so as to provide a relatively short pulse from the amplifier 14. As this pulse commences, it operates both switching tubes $T_1$ and $T_2$. Thus both capacitors $C_1$ and $C_2$ start to charge through resistors $R_1$ and $R_2$ respectively. Since tube $D_1$ is to count small fibers, its $R_1C_1$ time constant will be relatively short, and tube $D_1$ will be fired by any short pulse from amplifier 14 which exceeds the predetermined relatively short length. Accordingly, such a short pulse will feed a signal to group counter 18. A long pulse from amplifier 14 will trigger tube $D_1$ first and will then trigger $D_2$ somewhat later, due to the relatively longer time constant $R_2C_2$. In this case, both group counters 18 and 20 will be energized. Suitable subtracting means, such as those described in Roehrig application Serial No. 492,716, filed March 7, 1955, now Patent No. 2,874,899, may be employed to obtain a net group count and thus directly obtain a particle size distribution.

Switching tubes $T_1$ and $T_2$ will restore capacitors $C_1$ and $C_2$ to their standard substantially discharged condition at the cessation of the negative signal from amplifier 14. In one preferred embodiment of the invention, switching tubes $T_1$ and $T_2$ are 12AU7, and discriminator tubes $D_1$ and $D_2$ are 2050 Thyratrons. The precision D.C. voltage supply 16 is preferably of the type shown on page 551 of "Electronic Instruments," Greenwood, Holdam and MacRae, vol. 21, Radiation Laboratory Series, McGraw-Hill Company, 1948. Other suitable regulated voltage supplies are illustrated on page 1216 of "Radiation Designer's Handbook," Langford-Smith, Fourth Edition, 1953, reproduced and distributed by RCA Victor Division, Radio Corporation of America, Harrison, New Jersey. Voltage regulator tubes $V_1$ and $V_2$ are preferably OB2 gas tubes.

While there has been described only one preferred switching system, which operates on an essentially square wave pulse from the amplifier 14, obviously numerous alternative circuits can be provided. For example, the amplifier may produce time-spaced pulses rather than a single pulse for each fiber measured. In this case, tubes $T_1$ and $T_2$ can be arranged to be made non-conducting by the first pulse and made conducting by the second pulse. A double stable multivibrator on the input to the tubes would accomplish this result. Equally, while the present invention has been described in connection with the use of only two discriminator tubes and counter circuits, numerous additional discriminator tubes and counter circuits can be employed when desired.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. A means for measuring size distribution of a plurality of objects, said means including electrical means for sequentially measuring individual objects to obtain electrical pulses, the duration of an individual pulse being a function of a measured dimension of an individual object, a plurality of capacitors arranged to be charged by the pulses at predetermined steady rates, a plurality of discriminator tubes whose time of firing is controlled by the attainment of predetermined charges on the capacitors, each discriminator tube being controlled by its own capacitor, the various capacitors having different times for firing their associated discriminator tubes upon being charged at their predetermined rates whereby pulses of different durations will fire different discriminator tubes, a regulated power supply for charging at least one of said capacitors, a voltage regulator tube for controlling both the grid bias of said discriminator tube and the output of the regulated power supply so that a variation in the output of the voltage regulator tube will produce counterbalancing changes in both the bias of the discriminator tube and the amplitude of the capacitor charging current, and a counting means for each discriminator tube, the operation of each counting means being controlled by the firing of its associated discriminator tube.

2. Means for measuring fiber diameters comprising electrical means for scanning individual fibers to obtain electrical signals, each of said signals having a time duration which is a function of the measured diameter, means controlled by the start of said signal for starting the charge of a capacitor, a voltage regulator tube providing a relatively fixed voltage which controls the charging rate of said capacitor, said relatively fixed voltage provided by said voltage regulator tube also furnishing at least a part of the grid bias of a discriminator tube whose operation is dependent upon the presence of a predetermined voltage on the capacitor, and a counting circuit controlled by the discriminator tube.

3. Means for discriminating between electrical pulses having different lengths comprising a plurality of capacitors arranged to be charged by the pulses at predetermined steady rates, a plurality of discriminator tubes whose time of firing is controlled by the attainment of predetermined charges on the capacitors, each discriminator tube being controlled by its own capacitor, the various capacitors having different times for firing their associated discriminator tubes upon being charged at their predetermined rates whereby pulses of different lengths will fire different discriminator tubes, a regulated power supply for charging said capacitors, a voltage regulator tube for controlling both the bias of said discriminator tubes and the output of the regulated power supply so that a variation in the output of the voltage regulator tube will produce counterbalancing changes in both the grid bias of the discriminator tubes and the amplitude of the capacitor charging currents.

4. Means for counting the number of electrical pulses in a group of sequential pulses which have a time duration greater than a predetermined time, means controlled by the start of said pulse for starting the charge of a capacitor, a voltage regulator tube providing a relatively fixed voltage which controls the charging rate of said capacitor, said relatively fixed voltage provided by said voltage regulator tube also furnishing at least a part of the grid bias of a discriminator tube whose operation is dependent upon the presence of a predetermined voltage on the capacitor, a counting circuit controlled by the discriminator tube, and means for discharging the capacitor at the end of the pulse, said predetermined voltage on the capacitor being the voltage corresponding to said predetermined time.

5. Means for measuring fiber diameters comprising an electrical optical system for scanning individual fibers, said system including means for creating relative motion between an image of a fiber to be measured and an optical system, electrical means for starting the charging of a capacitor as said fiber bears a first predetermined position with respect to the optical system and for discharging the capacitor when the fiber bears a second predetermined position with respect to the optical system, a voltage regulator tube providing a relatively fixed voltage which controls the charging rate of said capacitor, said relatively fixed voltage provided by said voltage regulator tube also furnishing at least a part of the grid bias of a discriminator tube whose operation is dependent upon the presence of a predetermined voltage on the capacitor, and a counting circuit controlled by the discriminator tube.

References Cited in the file of this patent

UNITED STATES PATENTS

| | | |
|---|---|---|
| 2,617,593 | Audier et al. | Nov. 11, 1952 |
| 2,642,527 | Kelley | June 16, 1953 |
| 2,699,701 | Strother et al. | Jan. 18, 1955 |
| 2,784,910 | Ghiorso | Mar. 12, 1957 |
| 2,791,695 | Bareford et al. | May 7, 1957 |
| 2,874,899 | Roehrig | Feb. 24, 1959 |